United States Patent

[11] 3,632,273

[72] Inventor Anthony P. Savickas
7931 East Drive, North Bay Village, Miami Beach, Fla. 33141
[21] Appl. No. 47,745
[22] Filed June 19, 1970
[45] Patented Jan. 4, 1972

[54] MACHINE FOR PRODUCING SIMULATED BAMBOO
8 Claims, 8 Drawing Figs.

[52] U.S. Cl.................................................. 425/392,
65/279, 72/84, 72/110, 65/276, 425/384, 425/385, 425/397
[51] Int. Cl...................................................... B29c 17/00
[50] Field of Search............................................ 18/19 TM,
19 TE, 19 R, 4 R, 14 R, 5 RR, 13 RR, 9, 10, DIG. 39, DIG. 41; 264/293, 296; 65/244, 276, 279; 72/84, 107, 110

[56] References Cited
UNITED STATES PATENTS
| 2,575,746 | 11/1951 | Cartun | 65/279 X |
| 3,205,289 | 9/1965 | Carpenter | 18/19 TM X |
| 3,309,188 | 3/1967 | Porter et al. | 65/276 X |
| 3,339,004 | 8/1967 | Nardone | 264/296 X |

FOREIGN PATENTS
| 688,437 | 3/1953 | Great Britain | 65/279 |

*Primary Examiner*—Robert L. Spicer, Jr.
*Attorney*—Salvatore G. Militana

ABSTRACT: A machine for converting plain plastic tubing such as polyvinyl chloride tubing and the like into simulated bamboo for use in the manufacture of furniture, etc. by forming on the plain plastic tubing a plurality of spaced peripheral ridges along the full length of the tubing. The machine supports a length of the tubing by means of pairs of rollers and heats the tubing between the rollers at the positions ridges are to be formed as the tube is rotated. The pairs of rollers are mounted so that one roller may slide a short distance in the direction of the other roller whereby upon heating the tubing and sliding one roller in each pair in the direction of the other rollers simultaneously with forcing the axial movement of the plastic tubing, peripheral or circumferential ridges will be formed on the plain plastic tubing. The tubing is then cooled off to cause the ridges to become set.

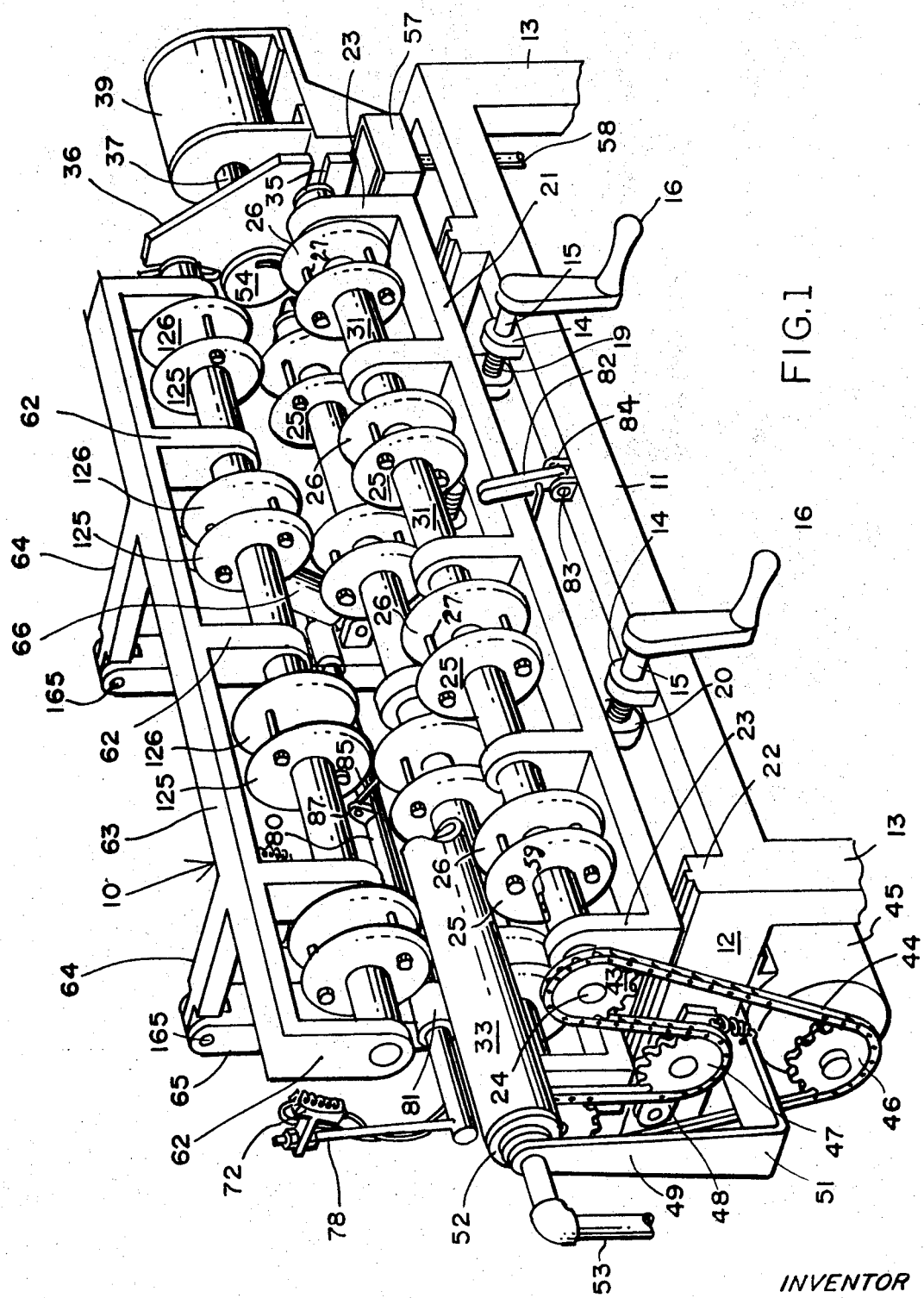

PATENTED JAN 4 1972

INVENTOR
ANTHONY P. SAVICKAS
BY
Salvatore G. Militano
ATTORNEY

MACHINE FOR PRODUCING SIMULATED BAMBOO

CROSS-REFERENCES TO RELATED APPLICATION

This application is a copending application of my patent application Ser. No. 858,329, filed on Sept. 16, 1969, for Molded Plastic Fitting, wherein there is shown and described fittings for simulated bamboo tubular members used in the fabrication of furniture and the like.

BACKGROUND OF THE INVENTION

This invention relates to the production of simulated bamboo from plain thermoplastic tubing such as polyvinyl chloride piping and the like. At the present time such a product is not being produced. In order to successfully compete against real bamboo, the simulated bamboo must be produced by mass production methods in order that the cost of producing same be low. Plastic tubing is well suited for furniture in that it is rugged, weather resistant, strong, easy to clean as well as easy to fabricate and being available when needed. While on the other hand, bamboo comes from the Orient so that not only are costs high, but at times the bamboo is not available.

SUMMARY OF THE INVENTION

The present invention provides a machine for the mass production of simulated bamboo. In a preferred embodiment, the machine is capable of quickly and readily forming a plurality of spaced peripheral ridges on a length of thermoplastic tubing by the use of heat and pressure, then cooling the heated portions of tubing whereby the length of simulated bamboo is removed and replaced by other tubing. The machine may be adjusted to receive tubing of various diameters.

Therefore, it is a principal object of the present invention to provide a machine for the mass production of stimulated bamboo from thermoplastic tubing whereby production costs are relatively low and the volume of production by the machine is substantially high.

Another object of the present invention is to provide a machine for the mass production of simulated bamboo wherein the machine is readily operated by a person of ordinary skill and the ridges formed on the thermoplastic tubing are accurately and perfectly formed at all times.

A still further object of the present invention is to provide a machine for the mass production of simulated bamboo wherein the machine is readily adjustable for receiving tubing of various diameters.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

BRIEF DESCRIPTION OF THE DRAWINGS

FIG. 1 is a perspective view of my machine for converting thermoplastic tubular members into simulated bamboo.

FIG. 2 is a front elevational view.

FIG. 8 is a side view of a tubular member simulating bamboo as produced by my machine.

DESCRIPTION OF THE PREFERRED EMBODIMENT

Figure 3:
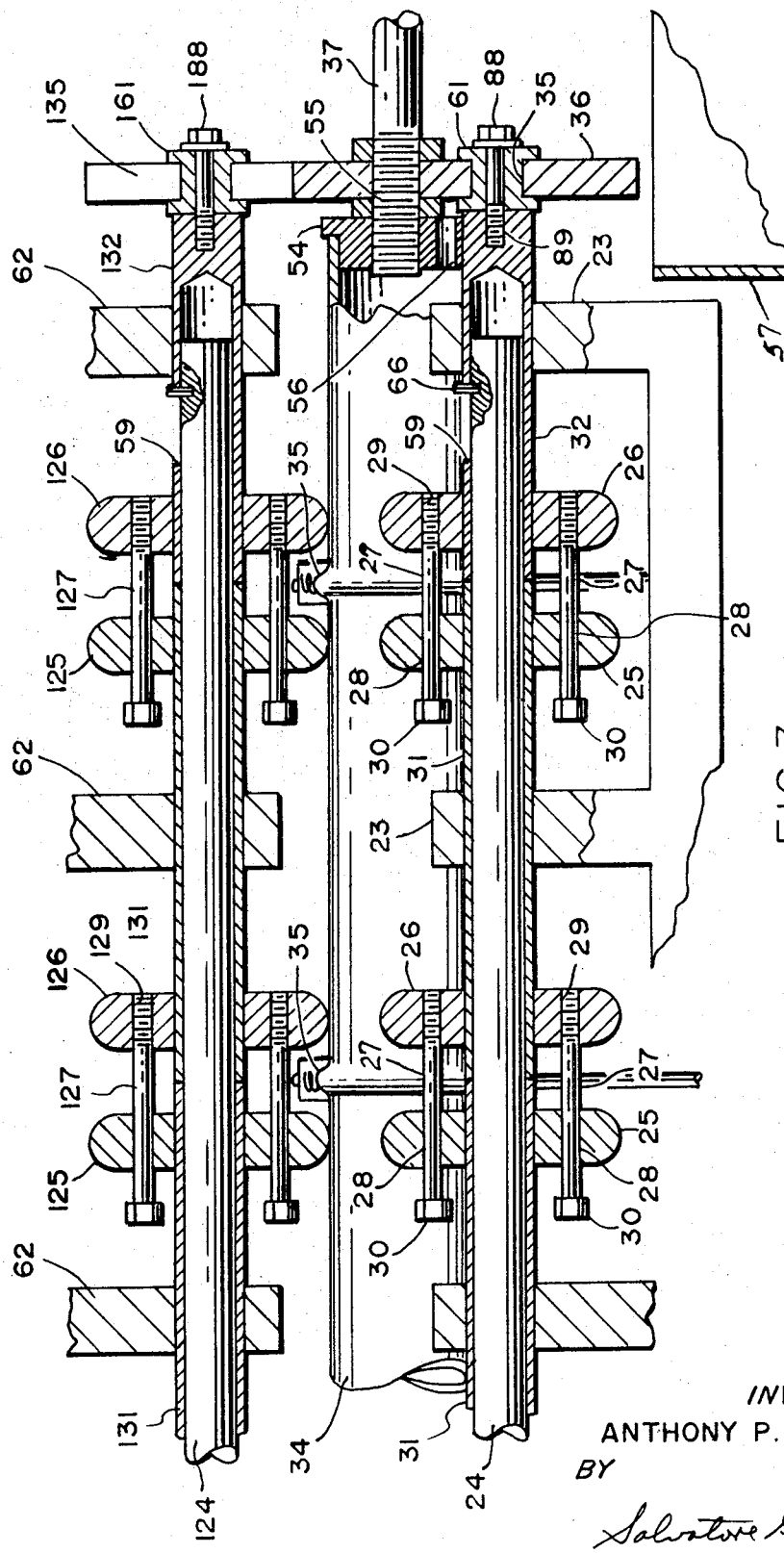
FIG. 3 is a fragmentary cross-sectional view taken along the line 3—3 of FIG. 4.

Referring to the drawings wherein like numerals are used to designate similar parts throughout the several views, the numeral 10 refers to my machine for converting thermoplastic tubular members into simulated bamboo consisting of a horizontal support frame formed by tubular members 11, 12 welded together at their end portions and supported by legs 13. Mounted on the support members 11, 11 are a pair of bearing supports 14 in each of which a shaft 15 is journaled for rotation by means of a handle 16 secured to the front end of the shaft 15. Adjacent the rear end portion of the shafts 15 are sprocket wheels 17 engaged by a sprocket chain 18 that compels the simultaneous rotation of both shafts 15 when either of the handles 16 is actuated. Each of the shafts 15 are threaded by a pair of like or similar right- and left-handed threads 18, 19 respectively, extending to the exact midportion of the shaft 15.

Threadedly mounted on the left and right threads 18, 19 of the shaft 15 are carriers 20 on each of which is mounted a horizontal wheel support bar 21 that extends approximately the full length of my machine 10. The wheel support bars 21 are slidably mounted on tracks 22 that extend from the front to the rear tubular support members 11.

There is provided on both of the wheel support bars 21 a plurality of upright bearing supports 23 which rotatably support a shaft 24 and a plurality of telescopically mounted end sleeves 32 and spacer sleeves 31. See FIGS. 2 and 3. To compel the unitary rotational movements of the shafts 24 and sleeves 32, while the latter may slide longitudinally of the shafts 24, the end sleeves 32 and the extreme left spacer sleeves 31, as seen in FIG. 2, are provided with a key slot 59 through which extends a pin 66 secured to the shafts 24. The shafts 24 terminate within the end sleeves 32 short of the end of the sleeve 32 to allow for the sliding movement of the sleeves 32 on the shafts 24.

Mounted on the spacer and end sleeves 31 and 32 and to rotate therewith are plastic tubular member engaging wheels or rollers 25 and 26 fastened together by rods 27. The rods 27 are slidably mounted in bores 28 formed in the rollers 25 and secured at their threaded ends to bores 29 in the rollers 26. The head portions 30 limit the sliding movement of the rods 27 in the bores 28 of the rollers 25. It is to be noted that rollers 25 and 26 are mounted adjacent the ends of the spacer sleeves 31, 32 which do not normally abut against each other but are spaced from each other. The gap between the ends of the spacer sleeves 31, 32 is equal to the length of the rods 27 that extend beyond the rollers 25, 26 when the rollers are at their minimum distance apart.

The end spacer sleeves 32 are provided with a threaded bore 89 in which a bolt 88 is threaded rotatably carrying a slotted slide member 61 that are slidably mounted in horizontals lots 35 formed in an end plate 36. The latter is secured to the threaded free end 55 of a piston rod 37 extending from a piston 38 mounted in a cylinder 39. Also, mounted on the extreme end 55 of the piston rod 37 is a cylindrical stepped plate 54 for receiving the end of a plastic tubular member 34 that is to be converted into simulated bamboo. The end plate 54 is provided with a bore 56 to permit a coolant such as water to be discharged therethrough into a drain pan 57 and a drain line 58. There are fluid conduits 40 and 41 connected to each end of the cylinder 39 so that fluid under pressure entering the cylinder through the fluid conduit 40 will cause the piston 38 and end plate 36 to slide to the left as seen in FIGS. 1 and 2 while movement of the end plate 36 in the opposite direction is caused when fluid under pressure enters the cylinder through the fluid conduit 41.

Figure 7:
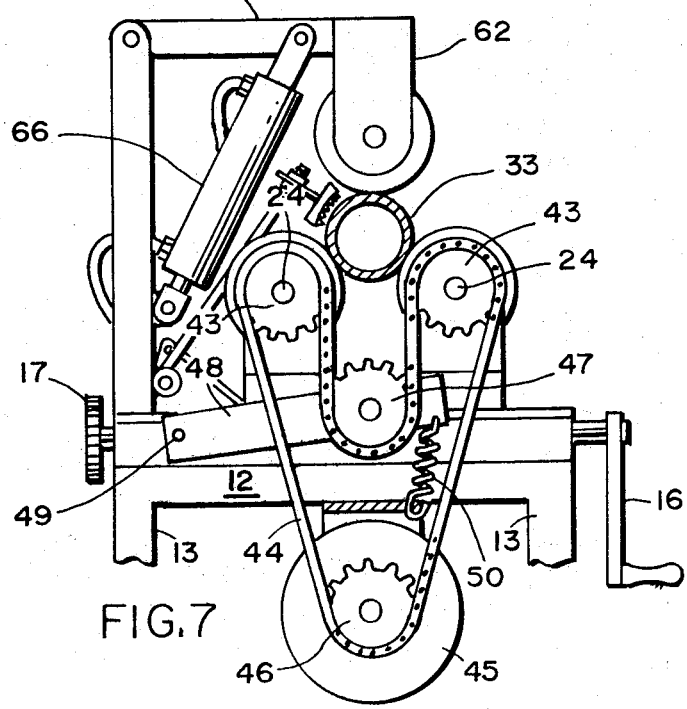

At the other or left end of each of the shafts 24 is a sprocket wheel 43 that is in mesh engagement with an endless sprocket chain 44 engaging a sprocket wheel 46 powered by a motor 45 mounted on the tubular frame member 12. In order to permit adjustment in the positions of the sprocket wheels 43 for different sized tubing 33, a takeup sprocket wheel 47 is engaged by the sprocket chain 44. The sprocket wheel 47 is rotatably mounted on a lever 48 pivoted at one end as at 49 to the frame member 12 while the other end of the lever 48 is yieldingly held in position by a coil spring 50. See FIGS. 2 and 7.

Also, mounted on the left side along the longitudinal centerline of my machine 10 is a bracket 51 extending upwardly thereof and having a bored end plate 52 similar to the end plate 54 in alignment therewith along the centerline of the end plate 36. Connected to a bore in the end plate 52 is a valved pipe 53 which is connected to a source of water (not shown). The plain thermoplastic pipe 33, when placed in position to be converted to simulated bamboo pipe 34 is butted against the end plate 54 at one end and received at the other end by the end plate 52 so that water passing through the pipe 53 will flow through the plastic pipe 33 to be discharged through the opening 56 and into the pan 57 and leave the machine 10 by the discharge outlet 58.

The plain thermoplastic pipe 33 which normally rests on the front and rear rollers 25, 26 is gripped by a third set of rollers 125, 126 identical in number, construction and arrangement with the rollers 25, 26 engaging the upper portion of the plastic pipe 33 with spacer sleeves 131, 132 and telescopically positioned shaft 124 identical in construction with the spacer sleeves 31, 32 and shaft 24. The spacer sleeves 131, 132 are rotatably supported by bearing supports 62 that depend from a tubular overhead bar 63. The latter is provided with a pair of support arms 64 that extend rearwardly to upright support members 65 where they are rotatably joined as at 165 for swinging movement of the bar 63. See FIGS. 5 and 6. This swinging movement is powered by fluid pressure exerted in a cylinder 66 against a piston 67 to which a piston rod 68 is secured, extending and pivoted as at 69 to the upright supports 65. At the other end of the cylinder 66 there is secured a member 70 that extends to the support arms 64 where it is pivotally secured as at 71. Fluid pressure lines 72 and 73 permit the flow of fluid under pressure to and from either side of the piston 67 so that when pressure fluid enters the cylinder 66 by means of the pipe 73 the tubular bar 63 with the rollers 59, 60 carried thereon will swing upwardly to the dotted or inoperative position to permit a plastic tube 33 to be placed on the rollers 25, 26. When fluid pressure flows through the pressure line 72, the piston 67 slides inwardly of the cylinder 66 to cause the tubular bar 63 and rollers 125, 126 to swing downwardly and engage the plastic tube 33 preparatory to forming ridges 35 thereon.

As stated hereinabove, the rollers 125 and 126 are identical to the rollers 25 and 26. The remaining structure such as spacer sleeves 131, 132 spacer rods 127 and shaft 124 are identical in size, function and arrangement with the spacer sleeves 31, 32 spacer rods 27 and shaft 24 respectively. The end of shaft 124 is spaced from the end of the sleeve 32 which is secured to a slotted slide member 161 slidably mounted in an arcuate slot 135 formed in the end plate 36. A bolt 188 secures the sleeve 132 to the slide member 161. The rollers 125, 126 are always in vertical alignment with the rollers 25, 26, respectively.

Figure 4:
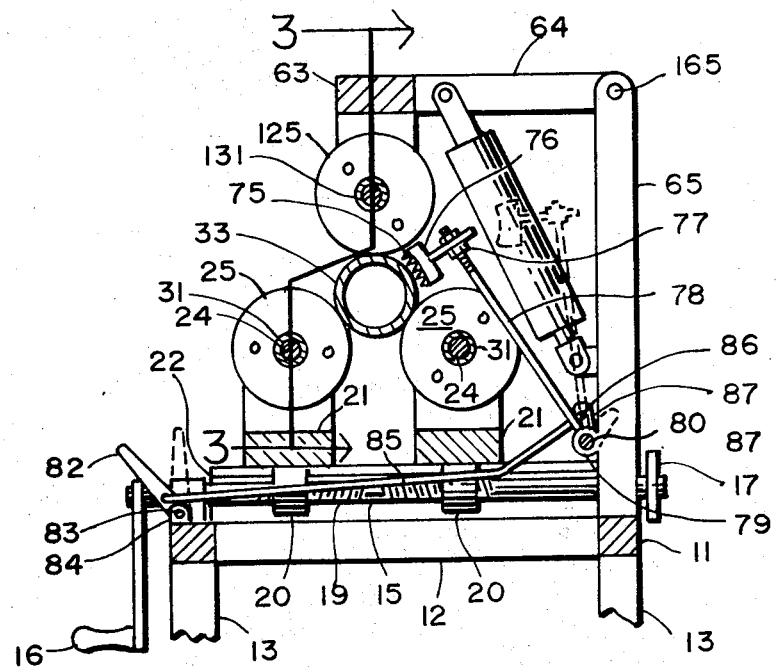
FIG. 4 to FIG. 7 inclusive are cross-sectional views taken along the lines 4—4, 5—5, 6—6, and 7—7 respectively of FIG. 2.

Since heat is required to form the ridges 35 on the plain thermoplastic tubing 33 to simulate bamboo, a plurality of heating elements 75 each formed into an arc of a circle and mounted on a ceramic base 76 that is secured to the end of an arm 77. See FIGS. 1, 2 and 4. The arms 77 are each adjustably secured to the end of a rod 78 whose other end is welded to a sleeve 79 that extends the full length of a shaft 80 and is rotatably mounted thereon. The shaft 80 extends approximately the full length of the machine 10 and is rotatably secured to the machine 10 at its ends as at 81. In order to swing the heating elements in and out of operative position, there is provided an operating lever 82 at the front of the machine 10 pivoted as at 83 in its lower end to a bracket 84. A rod 85 pivotally secured to the operating lever 82 extends to the rear of the machine 10 where it is pivoted as at 86 to a crank 87 whose lower end is secured to the sleeve 79 for unitary rotation therewith. When the actuating lever 82 is in its forward or solid line position as shown by FIG. 4, the heating elements 75 will be at their operating position in close proximity to the plastic tube 33 to heat it at the locations where ridges 35 are to be formed. When the ridges 35 have been formed and the finished plastic tube 34 is to be replaced by another plain plastic tube 33, the lever 82 is swung rearwardly to the dotted line position causing the sleeve 79 to rotate and the elongated rods 78 to swing and carry the heating elements rearwardly away from the tube 34 to the dotted line position.

Figure 6:
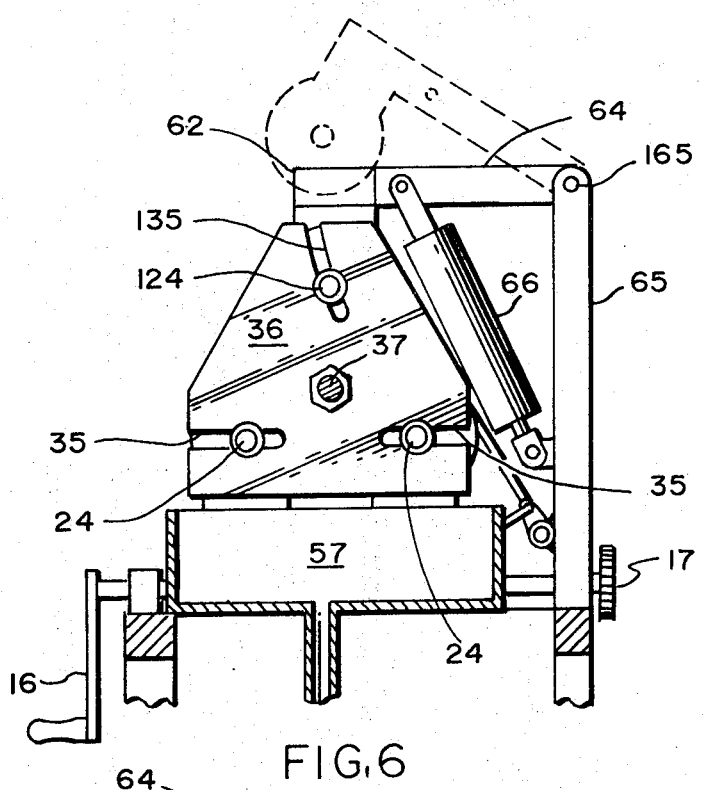

In the normal operation of my machine 10 for converting the plain thermosetting plastic tube 33 to a bamboo simulating tube 34, the heating elements 75 and the upper rollers 125, 126 and assembly have been pivoted to their inoperative positions has shown in dotted lines by FIGS. 4 and 6 respectively.

Either or both of the operating handles 16 are rotated to adjust the proper positioning of the rollers 25, 26 to accommodate and properly support the plain thermoplastic tube 33, which position is determined by the diameter of the tube 33. A length of thermoplastic tube 33 is then placed on the rollers 25, 26 with one end fitted into the end plate 54 and the other end abutting against the backing plate 52. Fluid pressure is now permitted to enter the cylinder 66 through the conduit 67 to cause the upper rollers 125, 126 to swing downwardly and engage the tube 33 so that the tube 33 is now firmly gripped by the two sets of horizontally positioned lower rollers 25, 26 and the upper rollers 125, 126. The heating elements 75 are then swung to their operating position adjacent the tube 33 upon pulling the operating lever 82 forwardly to the solid line position. The motor 44 is now energized along with the heating elements 75 whereby the shafts 24 rotate to cause the sleeves 31, 32 to rotate which in turn cause the rollers 25, 26 to rotate. The thermoplastic tube 33 which is engaged by the rollers 25, 26 will now rotate and will cause the rollers 125, 126 to likewise rotate. As the tubing 33 rotates about its axis along with the end plates 52 and 54, the heating elements 75 are heating the tubing 33 along a vertical plane on the periphery of tubing 33 where the ridges 35 are eventually formed.

Figure 5:
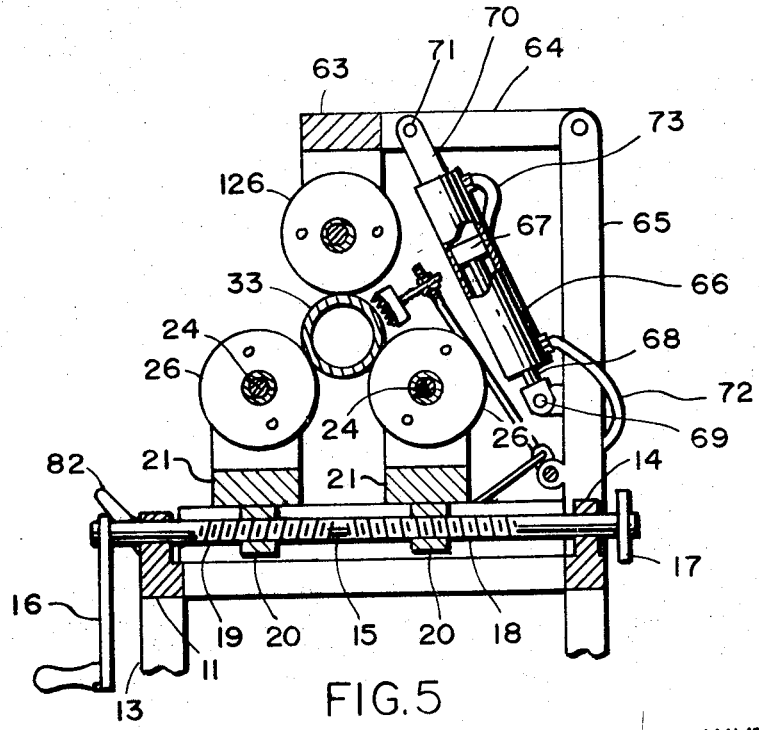

When the plastic material of the pipe 33 opposite the heating elements 75 has been heated to the extent that the material has been sufficiently softened, fluid pressure is permitted to flow through the pipe 40 into the cylinder 39 to cause the piston and piston rod 38, 37 to slide to the left as seen in FIG. 2. At the same time the heating elements 75 are deenergized and swung out of operative position to the dotted lines as shown by FIG. 5 by actuating the lever 82. Movement of the piston rod 37 causes movement of the end plates 36, 54 against which sleeves 32, 133 and the thermoplastic tube 33 abuts. As the end plates 36 and 54 move to the left, as shown by FIGS. 2 and 3, the sleeves 31, 132 and the rollers 26, 126 attached to these two sleeves slide to the left until the gaps or spaces between the sleeves 32, 132 and adjacent sleeves 31, 131 are closed. Since the rollers 26, 126 grip and carry the thermoplastic tubing 33 as they slide to the left, the previously heated portion of the thermoplastic tubing 33 is forced outwardly to form a first symmetrical ridge portion 35 as the tubing 33 is continuously rotated.

After the sleeves 32, 132 engage the first spacer sleeves 31, 131 to close the gap therebetween and the first ridge 35 has been formed on the tubing 33, the continued sliding movement of the end plate 36 causes the next set of spacer sleeves 31, 141 to slide to the left toward their adjacent sleeves 31, 131 to close the gap therebetween and form another ridge 35 on the tubing 33. This sequence of events continues as spacer sleeves 31, 131 slide to the left to close the spaces therebetween and form ridges 35 until the extreme left spacer sleeves 31 are engaged by the adjacent spacer sleeves 31, 131. Then water is permitted to flow through the pipe 53 through the plastic tube 33 on which the ridges 35 have been formed to cool the plastic pipe 33 so that the ridge formation 35 becomes set. The water is continued to flow through the plastic tube 34 to be discharged through discharge opening 56 in the end plate 54 and into the pan 57 and discharge pipe 58.

After the thermoplastic pipe 33 now formed into the finished bamboo simulated pipe 34 has been coiled at the heated portions thereof, the ridges 35 will have become set; the motor 44 is then deenergized and pressure fluid is permitted to enter the cylinder 66 through the pipe 73 to cause the cylinder 66 to slide to the left and the support arms 64 to swing upwardly carrying the tubular bars 63 and rollers 125, 126 upwardly away from the bamboo simulated tube 34. Now, fluid pressure is permitted to enter the cylinder 39 through the pipe 41 to cause the piston 38, piston 37 and end plates 36, 54 to slide to the right in order to remove the newly formed length of bamboo simulated thermoplastic tubing 35 from the machine 10. To continue the production of bamboo simulated tubing 35, another plain thermoplastic tubing 33 is placed on the rollers 25, 26 with the ends of the tubing 33 receiving the end plates 52, 54.

As can readily be noted from the above discussion taken in connection with the accompanying drawings, my machine 10 converts a length of ordinary thermoplastic tubing 33 such as polyvinyl chloride piping into a decorative simulated bamboo tubing 35 for the fabrication of furniture, lamps and the like.

What I claim as new and desire to secure by Letters Patent of the United States is:

1. A machine for converting the plain thermoplastic tubing into simulated bamboo having a longitudinal axis comprising a support, means mounted on said support for receiving a length of said tubing, rotatable means mounted on said support engaging the ends of said tubing, power-operated means rotating said rotatable means for rotating said tubing, heating means mounted in proximity of said tubing, and sliding means engaging one end of said tubing receiving means and said rotatable means and power-operated means applying a force on said sliding means in the direction of said other and whereby ridges are formed at said heated portions of tubing to simulate bamboo.

2. The structure as recited by claim 1 wherein said tubing engaging and rotatable means comprise a plurality of shafts, extending in substantially parallel relation, a plurality of sleeves mounted on said shafts, said sleeves terminating in spaced relation to each other to form a gap, and roller means mounted substantially concentrically on said sleeves adjacent said gaps.

3. The structure as recited by claim 2 wherein a pair of said shafts lie substantially in a horizontal plane and a third shaft lying in a plane above said pair of shafts for engaging said tubing and said roller means of one of said shafts lying substantially in alignment with said roller means on said other of said shafts.

4. The structure as recited by claim 3 wherein said sliding means comprise end plate means having a plurality of slots receiving end portions of said shafts, said tubing engaging rotatable means being mounted on said end plate means.

5. The structure as recited by claim 4 and fluid means connected at either end of said tubing engaging and rotatable means for cooling said heated portions of said tubing.

6. The structure as recited by claim 3 and adjustable means mounting said pair of shafts substantially equidistant from said longitudinal axis for receiving tubing of different diameters and means pivotally mounting said third shaft whereby said roller means of said third shaft lie on said tubing.

7. The structure as recited by claim 6 wherein said adjustable means comprises a threaded shaft having reverse threads extending from a center portion and follower engaging each of said reverse threads supporting said shafts lying in a horizontal plane whereby upon rotation of said threaded shaft said rollers mounted on said last-named shafts move equal distances from said center portion in a horizontal plane for receiving tubing of varying diameters.

8. The structure as recited by claim 7 and pivot means mounting said heating means for swinging said heating means away from said tubing.

* * * * *